United States Patent [19]
Gondo

[11] Patent Number: 5,706,818
[45] Date of Patent: Jan. 13, 1998

[54] ULTRASONIC DIAGNOSING APPARATUS

[75] Inventor: Masahiko Gondo, Yamanashi-ken, Japan

[73] Assignee: Olympus Optical Co., Ltd., Shibuya-ku, Japan

[21] Appl. No.: 726,454

[22] Filed: Oct. 4, 1996

[30] Foreign Application Priority Data

Oct. 13, 1995 [JP] Japan ................... 7-265515

[51] Int. Cl.$^6$ ................................................ A61B 8/06
[52] U.S. Cl. ...................... 128/661.09; 128/660.07
[58] Field of Search ................ 128/661.09, 662.06, 128/660.07

[56] References Cited

U.S. PATENT DOCUMENTS

| | | | |
|---|---|---|---|
| 4,325,257 | 4/1982 | Kino et al. | 73/626 |
| 5,299,576 | 4/1994 | Shiba | 128/660.07 |
| 5,349,960 | 9/1994 | Gondo | 128/661.09 |
| 5,431,169 | 7/1995 | Gondo | 128/661.09 |
| 5,453,575 | 9/1995 | O'Donnell et al. | 128/662.06 |
| 5,471,990 | 12/1995 | Thirsk | 128/661.09 |

FOREIGN PATENT DOCUMENTS 58-188433 of 1983 Japan .
62-153746 of 1987 Japan .
62-83655 of 1987 Japan .

OTHER PUBLICATIONS

"Ultrasound Phased Array Delay Lines Based on Quadrature Sampling Techniques", Jeffrey E. Powers et al., IEEE Transactions on Sonics and Ultrasonics, vol. SU-27, No. 6, pp. 287-294, Nov. 1980.

"Marine Acoustics:Fundamentals and Applications", The Marine Acoustics Society of Japan,pp. 170-173, 1984.

Primary Examiner—Marvin M. Lateef
Assistant Examiner—Derrick Fields
Attorney, Agent, or Firm—Kenyon & Kenyon

[57] ABSTRACT

An ultrasonic diagnosing apparatus for acquiring Doppler information at a focal point in an object under inspection from AC components of a spatial frequency distribution of ultrasonic waves reflected from the focal point by removing components reflected from an off-axial static reflector. A transmission trigger generating circuit drives in accordance with predetermined time shifts an array of piezo-electric elements to transmit an electronically converged ultrasonic beam. Reflected signals from a reflector on the axis of the beam only are stored in memory.

14 Claims, 10 Drawing Sheets

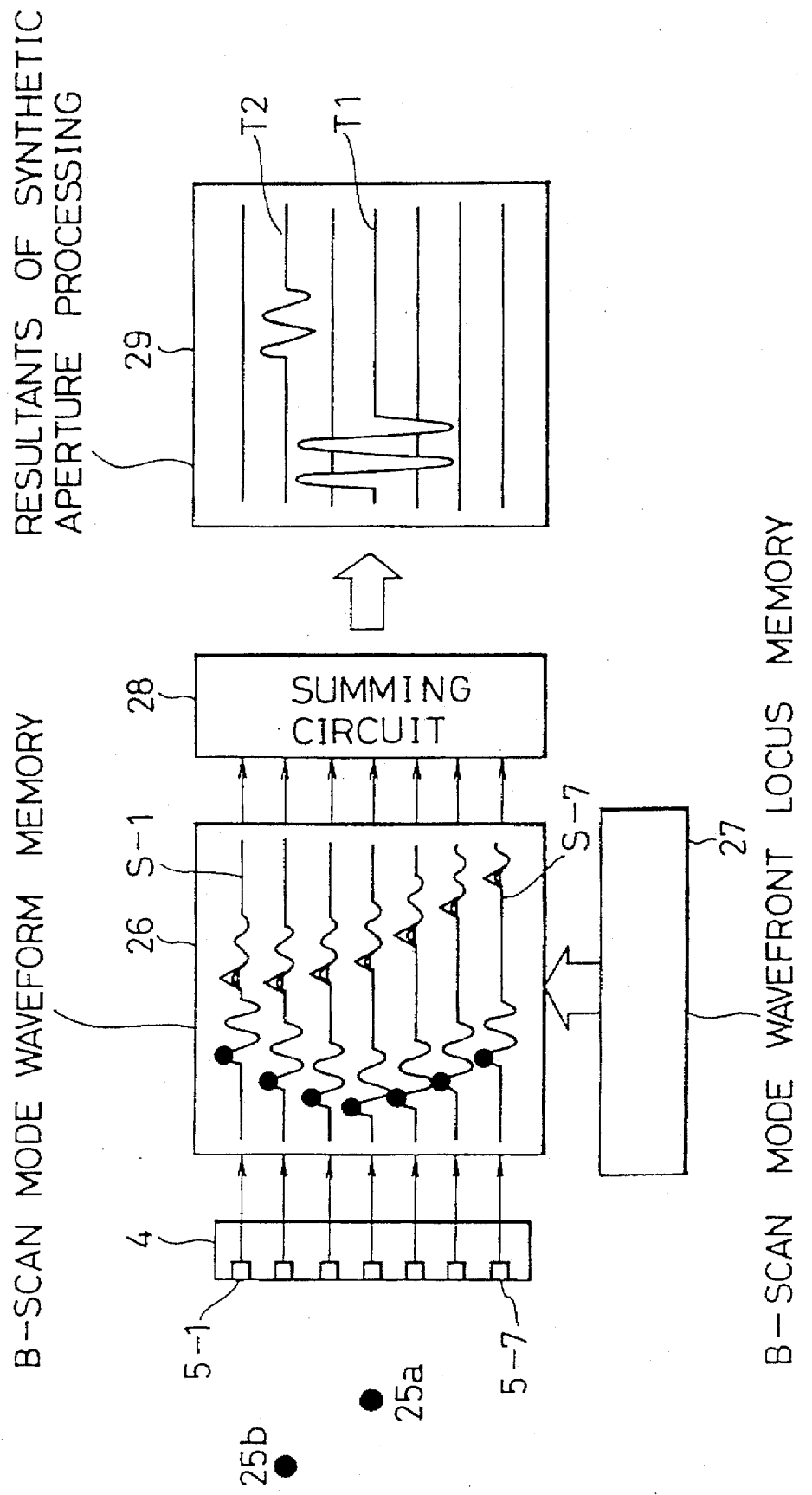

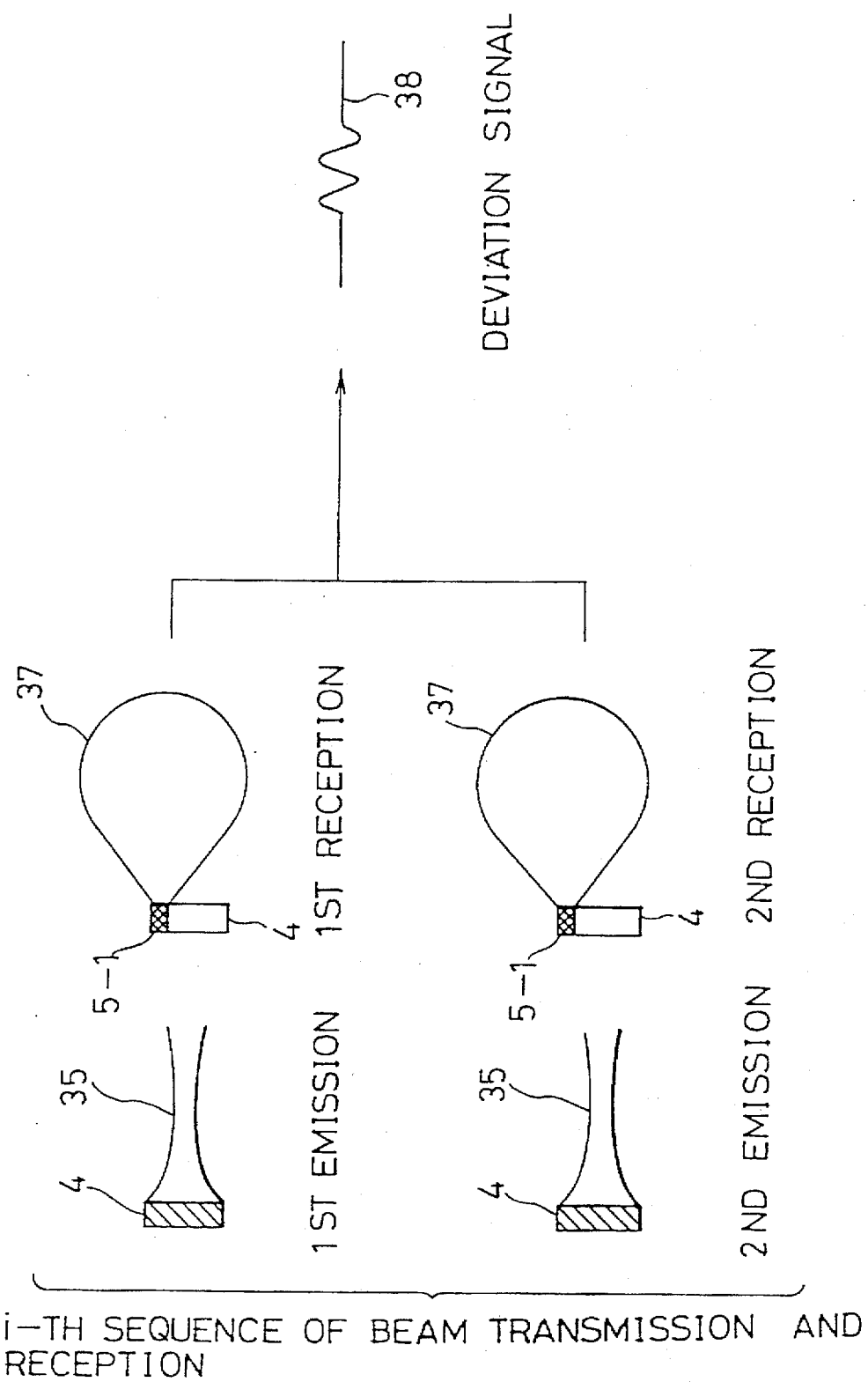

ULTRASONIC DIAGNOSING APPARATUS

BACKGROUND OF THE INVENTION

1. Field of the Invention

The present invention relates to an ultrasonic diagnosing apparatus for measuring a velocity of a blood flow in a living body by transmitting and receiving an ultrasonic wave, and for displaying a distribution of the velocity, and more particularly for obtaining and displaying a dynamic flow image by using a synthetic aperture.

2. Description of the Related Art

A color Doppler is a technique for obtaining information about the velocity of a blood flow by means of the Doppler effect. The results of the color Doppler technique is displayed as a pseudo-colored spatial distribution of the blood flow; this spatial distribution is superimposed on an ultrasonic tomogram of a living body, and this tomogram is obtained by an ultrasonic wave reflected from a reflector in the living body. The color Doppler technique has been widely used especially in the field of circulatory systems.

A principle of the velocity measurement of the blood flow is disclosed in Japanese Laid-Open Patent Application Publication No. Sho 58-188433. Transmitted electric signals are converted to ultrasonic pulse waves by an array of transducers and the ultrasonic pulse waves are periodically emitted to a reflector. The ultrasonic pulse waves reflected from the reflector at various distances from the transducer array are sampled to detect the change in frequency of the reflected waves.

This color Doppler function has been applied to the field of circulatory systems such as the heart or the like. However, recently, since the Doppler signals include a great deal of information, the color Doppler function has also been applied to the diagnosis of internal organs located in the abdomen. A block diagram of an ultrasonic diagnosing apparatus having the color Doppler function is shown in FIG. 11.

A signal generator 1 generates a reference signal in the form of a sine curve having a highly stable frequency. A transmission trigger generating circuit 2 detects the phase of the reference signal, and generates a timing signal synchronized with the reference signal. Further, based on this timing signal, the transmission trigger generating circuit 2 generates a group of trigger pulse waves with predetermined time delays for focusing on a predetermined focal point in the living body. The trigger pulse waves are amplified by transmission amplifiers 3. The amplified transmission pulse waves drive with the predetermined time delays a plurality of piezo-electric elements 5 arranged as an array in an ultrasonic transducer 4. Ultrasonic waves emitted by the respective piezo-electric elements 5 with the predetermined time delays form an ultrasonic beam to be focused on the predetermined point in the living body.

The ultrasonic waves reflected from the reflector in the living body are received by the piezo-electric elements 5, and converted to electric signals (reflection signals). The reflection signals are delayed by a delay circuit 6 and summed to be a synthesized reflection signal as if the ultrasonic waves reflected from the same reflector had reached the piezo-electric elements 5 simultaneously. Low noise amplifying, noise filtering and logarithm compression are implemented for the synthesized reflection signal by a pre-amplifier 8, a band-pass filter 9 and a logarithm amplifier 10, respectively. Then, the amplitude of the reflection signal is detected by a detector 11.

The detected amplitude of the reflection signal is attenuated in proportion with the distance between the reflection point and the ultrasonic transducer 4. Accordingly, a sensitivity time control (STC) signal, which is in the form of a sawtooth shaped signal, is generated by an STC signal generator 12 and added by an adder 13 to the detected amplitude of the reflection signal so that the attenuation caused by the distance is corrected.

Further, the amplitude of the reflection signal is converted to a digital signal by an analog-to-digital (A/D) converter 14, and transmitted to a digital scan converter (DSC) 15 to form an ultrasonic tomogram for diagnosis.

A Doppler processing section 16 implements the Doppler process. A quadrature demodulator 20 comprises a phase shifter 17, multipliers 18a and 18b, and lowpass filters 19a and 19b. The phase shifter 17 shifts the phase of the reference signal by $\pi/2$ radians. The quadrature demodulator 20 converts the reflection signal, which has not been logarithmically compressed by the logarithm amplifier 10, into a complex signal consisting of a real component I and an imaginary component Q. A/D converters 21a and 21b digitize each component of the complex signal.

A moving target indication (MTI) filter 22 filters the obtained complex signal to remove a direct-current (DC) component (clutter component) as a signal component from a still tissue, and extracts the component of the reflection signal of the blood flow.

The extracted component of the reflection signal of the blood flow is normally weak. In addition, the central frequency of its spectrum is unstable. In order to prevent error generation due to the weakness of the reflection signal and the instability of the spectrum, the ultrasonic beam is repeatedly transmitted and received in a predetermined direction in about ten cycles. A complex correlation operation is performed by an auto-correlator 23 for the blood flow reflection signals each shifted by one period. The obtained auto-correlation values are averaged for the ten cycles of transmission and reception. A Doppler frequency is determined from an argument of the complex-valued average, and the velocity of the blood flow in proportion with the Doppler frequency is calculated.

By scanning the ultrasonic beam, the velocity of the blood flow is measured as the 2-dimensional distribution in the living body. According to the direction or magnitude of the velocity of the dynamic blood flow, the blood flow velocity distribution is pseudo-colored in blue colors or red colors for visualizing, and outputted to the digital scan converter 15.

The digital scan converter 15 superimposes the ultrasonic tomogram formed by the intensity of the reflected ultrasonic wave on the 2-dimensional blood flow velocity distribution, and displays the superimposed image as a color flow image on a color monitor 24.

In the ultrasonic diagnosing apparatus described above, the ultrasonic beams for forming both the ultrasonic tomogram and the 2-dimensional blood flow velocity distribution are transmitted in a timesharing manner.

In the above color Doppler ultrasonic diagnosing apparatus, the timing of each spatial component of the ultrasonic beam is adjusted by the transmission trigger generating circuit 2 and the delay circuit 6. That is, the timing is determined so that the ultrasonic pulse waves generated by the respective piezo-electric elements 5 can simultaneously arrive at a predetermined focal point.

The ultrasonic pulse waves transmitted from the respective piezo-electric elements 5 form an ultrasonic beam which converges only at the focal point. At a point other than the focal point, the longer the distance between the point and the focal point is, the larger the radius of the ultrasonic beam becomes. Thus, the spatial resolution is decreased at the point spaced from the focal point.

Trials have been implemented to increase the spatial resolution over the entire image. One of the trials is a dynamically focused system, in which the beams are sequentially transmitted with the focal point being changed, and the focal point is sequentially changed when the beams are received.

The dynamically focused system can obtain a fine ultrasonic tomogram having high resolution. However, it requires complicated time control for reflection signal synthesizing. Moreover, since the dynamically focused system requires setting many focal points for each seamed line for forming the image, the ultrasonic pulse waves must be repeatedly transmitted, thereby decreasing the frame rate.

Disadvantages caused by the decline of the frame rate are particularly found in an ultrasonic diagnosing apparatus having the color Doppler function requiring a transmission and reception sequence for the color Doppler processing, in addition to a transmission and reception sequence for the ultrasonic tomogram. That is, in the former sequence, about tens of milliseconds is necessary for obtaining one image by processing the obtained data, so that the image cannot be displayed in real time when dynamic focusing is made at the time of beam transmission. Actually in such an ultrasonic diagnosing apparatus, the spatial resolution of the image is sacrificed to display the color Doppler image in real time.

The delay circuit for reflection signal synthesizing at the time of beam reception comprises a combination of an inductance L and a capacitance C so that its feasible delay time is limited. Also, its frequency response and absolute accuracy are limited. Further, performance largely varies from one delay circuit to another, and the cost of the delay circuit is high.

Another trial to increase the spatial resolution over the entire image is a synthetic aperture for forming the ultrasonic tomogram, as disclosed in Japanese Laid-Open Patent Applications Publication Nos. Sho 62-83655 and Sho 62-153746 and U.S. Pat. Nos. 4,325,257 and 4,841,489.

In the synthetic aperture, the piezo-electric elements are changed over, and the transmission and reception of the ultrasonic wave are repeated by the selected piezo-electric elements.

The ultrasonic waves are received by the respective piezo-electric elements and converted to electric signals (reflection signals), which are digitized and stored in the form of time-sequential signals in a memory. Along a wavefront of the ultrasonic waves from a desired focal point the respective reflection signals are read out from the memory, and the amplitudes of the reflection signals from the focal point are synthesized.

As described above, reflection signal synthesizing is performed by the read-out control of the reflection signals which are digitally stored. Thus, in contrast to the ultrasonic diagnosing apparatus illustrated in FIG. 11, using the delay circuit as an analog circuit component is not necessary. Further, the spatial resolution of the entire image can be highly increased in an inexpensive way.

However, a plurality of reflection signals from a plurality of piezo-electric elements sequentially selected must be used for determining one focal point. Thus, when the object to be observed is moved during the time of transmission or reception of the ultrasonic wave, the relative phases of the respective reflection signals are disordered so that the image cannot be correctly reconstructed. This is a disadvantage.

Accordingly, although the synthetic aperture can form a highly resolved image, it is difficult to visualize the dynamic blood flow.

Recently, however, an apparatus for visualizing the dynamic blood flow and its velocity distribution by using the synthetic aperture has been proposed.

A first type of such an apparatus is disclosed by O'Donnell et al. in U.S. Pat. No. 5,453,575. This patent discloses two kinds of signal processing modes: a static imaging mode for forming the image by the synthetic aperture and a flow imaging mode for forming the dynamic flow image without using the synthetic aperture. In the flow imaging mode, transmission and reception of an ultrasound waveform are repeated a plurality of times by an aperture synthesized by simultaneously activating a plurality of transducers. Obtained signal samples are alternatingly added and subtracted to obtain a reflection signal component deriving from a moving target. The obtained reflection signal component is stored in an acoustic frame buffer, and the stored reflection signal is read out for visualizing in accordance with a flow focus map memory. In the apparatus disclosed by O'Donnell et al., the amplifying rate of the reflection signal component from the blood flow is in proportion with the root of the number of times of the additions and subtractions. For example, the transmission and reception of the acoustic signal have to be repeated 256 times in order to increase the amplifying rate to 24 dB. Thus, the frame rate of the image is decreased. Further, the apparatus only discriminates whether the target is static or dynamic, and does not visualize the information of the velocity of the blood flow.

A second type of such an apparatus is disclosed by Gondo in U.S. Pat. No. 5,349,960 and constructs both static and flow images by the synthetic aperture. This apparatus is based on the principle that in a spatial spectrum of a response to the time of flight locus (TOF response), the dc component corresponds to the reflection signal component from a still target, and the ac component corresponds to the reflection signal component from a moving target. The TOF response refers to those portions of a plurality of received signals obtained by sequentially driving an array of transducers which are cut off along the wavefronts for implementing a synthetic aperture. Moreover, since the spatial frequency of the spectrum is related to the velocity of the moving target, the velocity field can be visualized. Further, even if the traveling direction of the ultrasonic wave is vertical to the direction of the flow, the velocity of the flow can be measured.

However, generally speaking, the intensity of the reflection signal from the blood flow is about 40 dB smaller than that from the still tissue. This indicates that the reflection signal from the blood flow does not have a sufficient signal-to-noise ratio. Thus, it is difficult to visualize the dynamic blood flow. Further, not only the reflection signal component from the moving target but also the reflection signal component from the still target offset from the principal axis of the composed wavefront (off-axis component) contributes to the ac component of the TOF response. Thus, it is necessary to separate the two components.

SUMMARY OF THE INVENTION

In order to solve the above problems, it is an object of the present invention to provide an ultrasonic diagnosing apparatus having a flow imaging function by using a synthetic aperture, in which a flow image having a sufficient signal-to-noise ratio can be obtained.

It is another object of the present invention to provide an ultrasonic diagnosing apparatus, in which an off-axis component is not mixed in a signal received by each piezo-electric element and thus which does not require a process for reducing the off-axis component.

It is a further object of the present invention to provide an ultrasonic diagnosing apparatus for obtaining a flow image having less noise, in which an MTI filter implements a pre-process for reducing a reflection signal component from a still target (i.e., a clutter component) in a reflection signal received by each piezo-electric element before the reflection signal from a moving target is extracted.

It is a still further object of the present invention to provide an MTI filter of simpler construction.

It is yet another object of the present invention to provide an ultrasonic diagnosing apparatus for detecting the direction of the velocity of a blood flow.

It is also an object of the present invention to provide an ultrasonic diagnosing apparatus, in which a single electronic detection system for detecting a received signal is provided for the whole group of piezo-electric elements so that the circuit structure can be simplified and no adjustment between channels is required.

It is another object of the present invention to provide an ultrasonic diagnosing apparatus having a small electronic system for fast extracting a reflection signal deriving from a moving target.

It is an even further object of the present invention to provide an ultrasonic diagnosing apparatus for outputting a flow image having less noise by further removing clutter components remaining in the extracted reflection signal from a moving target.

It is a still further object of the present invention to provide an ultrasonic diagnosing apparatus for simply calculating a velocity of a moving target on the basis of a spatial frequency distribution of a received signal.

It is a still another object of the present invention to provide a diagnosing apparatus for displaying the direction and magnitude of a flow velocity for sufficient visual recognition.

It is a still further object of the present invention to provide an ultrasonic diagnosing apparatus for sufficiently detecting a very small flow velocity.

It is an even further object of the present invention to provide an ultrasonic diagnosing apparatus for displaying a flow image for easily identifying an affected part.

An ultrasonic diagnosing apparatus according to the present invention comprises an ultrasonic transducer having a plurality of piezo-electric elements arranged in an array; a transmitting means for forming at least one electronically converged ultrasonic beam by driving a transmitting aperture, wherein said transmitting aperture consists of at least two of the piezo-electric elements driven in accordance with predetermined delays; a waveform storing means for storing a plurality of waveforms, each of said plurality of waveforms corresponding to a reflected signal received by a corresponding one of said piezo-electric elements; a wavefront locus storing means for storing a plurality of wavefront locus data corresponding to a plurality of focal points in an object under inspection, wherein said wavefront locus data comprises a data set of delay time that said piezo-electric elements form a wavefront focusing upon one of said focal points, and for outputting said wavefront locus data to said waveform storing means as read-out addresses such that said waveform storing means outputs a spatial distribution of said reflected signals along the direction of said wavefront; a data conversion means for converting said spatial distribution of said reflected signals from a spatial domain into a spatial frequency domain along said wavefront locus; and a velocity deriving means for deriving a velocity of a moving target in said object under inspection from the resulting spatial frequency distribution out of said data conversion means.

The ultrasonic diagnosing apparatus of the present invention uses the plurality of piezo-electric elements to emit the ultrasonic beams at regular periods. For each period, the ultrasonic wave reflected from the reflector, such as the blood flow or the like, is received by each selected piezo-electric element.

The received signal is stored as time sequential data in the waveform storing means.

This process is repeated N times per period (N is the number of the piezo-electric elements for receiving the ultrasonic waves) to store in the waveform storing means N sets of the time sequential data of the received signals corresponding to the respective piezo-electric elements.

On the other hand, according to the wavefront data outputted by the wavefront locus storing means for storing the wavefront data of the ultrasonic waves to focus on a desired point N sets of the data are read out from the waveform storing means, and the spatial frequency distribution of the read-out data is obtained.

Since the frequency axis of the spatial frequency distribution is in proportion with the velocity of the moving reflector, the Doppler information (that is, the velocity of the blood flow) at the focal point can be detected from the spatial frequency distribution of the signal components from the moving target.

Since the present invention obtains the Doppler information from the spectrum of the received signals, it is possible to detect the Doppler information by the synthetic aperture.

Especially, since the ultrasonic beam is formed by many piezo-electric elements at the time of the signal transmission, the signal from the moving target, which is normally very weak, has a fine signal-to-noise ratio for easy detection, so that a high-quality color flow image can be formed.

BRIEF DESCRIPTION OF THE DRAWINGS

A better understanding of the invention may be had from a consideration of the following detailed description, taken in conjunction with the accompanying drawings, in which:

FIG. 1 illustrates a concept of a synthetic aperture.

FIG. 4 illustrates an operation of an MTI filter adopted in the present invention.

DETAILED DESCRIPTION OF THE INVENTION

1. Principles

Figure 2A:
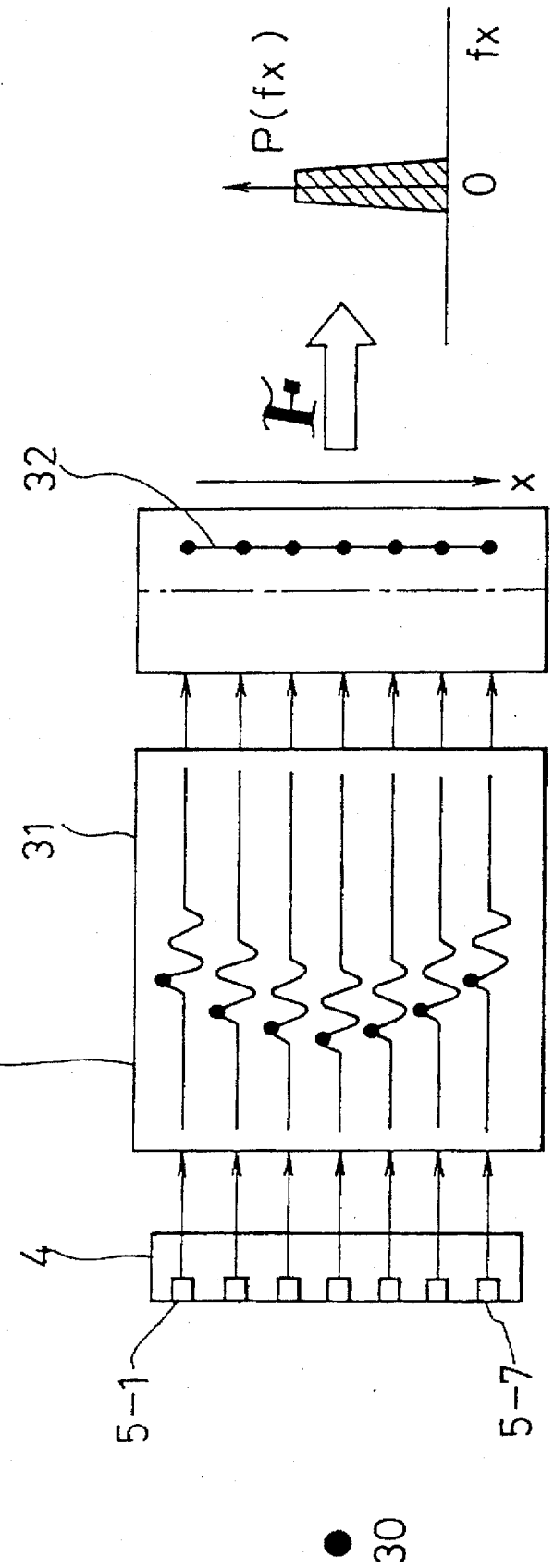
FIGS. 2(a) and 2(b) illustrate spatial frequency distributions of wave signals reflected from static and moving reflectors, respectively.

Before describing an embodiment of the present invention, referring to FIGS. 1-5, explanation will be made for a principle of detecting the Doppler information based on a synthetic aperture, which is a feature of the present invention.

FIG. 1 shows a principle of a synthetic aperture.

An ultrasonic pulse wave is emitted from a piezo-electric element 5-1 to first and second targets 25a and 25b. Ultrasonic waves reflected from the first and second targets 25a and 25b are received by the piezo-electric element 5-1, converted to an electric signal (received signal) S-1 as time-sequential data, and stored in a B-scan mode waveform memory 26. The same sequence is repeated to store other received signals S-2, . . . , S-7 in the B-scan mode waveform memory 26. Since the relative positions of the first and second targets 25a and 25b and the respective piezo-electric elements 5-1 (i=1, 2, . . . , 7) are different, these received signals have different waveforms.

For example, the ultrasonic wave reflected from the first target 25a is delayed along the time axis by a certain time corresponding to the distance between the first target 25a and each of the piezo-electric elements 5-i (i=1, 2, . . . , 7). The locus of the reflected waves comprises a hyperbola which is called a time of flight (TOF) locus.

According to address information outputted from a wavefront locus memory 27 having the memory addresses along the locus, the corresponding portions of the received signals are read out from the B-scan mode waveform memory 26. The portions to be read out are indicated by black solid circles ● on the respective received signals S-i (i=1, 2, . . . , 7) in FIG. 1.

The read-out portions of the received signals (hereinafter called the TOF response) are synthesized by a summing circuit 28 to extract a synthesized output T1 composed of information only from the first target 25 (a).

Similarly, when the address information along another locus is outputted from the wavefront locus memory 27 to read out the portions of the received signals indicated by triangles Δ in FIG. 1, a synthesized output T2 composed of information only from the second target 25(b) is extracted.

Thus, the portions of the received signals are read out and synthesized along the TOF loci for the whole space targeted for observation so that resultants of synthetic aperture processing 29 can be obtained.

An interesting feature of the synthetic aperture is that although each of the piezo-electric elements 5-1 (i=1, . . . , 7) has a wide directional response pattern, a sharp directional response pattern corresponding to the aperture synthesized by the whole piezo-electric elements receiving waves can be obtained since a synthetic process along the TOF locus is performed. Further, many TOF loci are prepared so that focusing can be performed at any point in the space targeted for observation. Hence, an image having free spatial resolution can be obtained.

Next, referring to FIGS. 2(a) and 2(b), a principle of detecting the movement of the reflector will now be described.

FIG. 2(a) shows a TOF response for a static target 30.

By the transmission and reception sequence described above, this time, a series of received signals are stored in a Doppler waveform storage means 31. When the portions of the stored signals are read out at the positions of the TOF locus indicated by black solid circles, a TOF response 32 is obtained. The TOF response is a set of amplitudes of the received signals corresponding to the static target 30. This TOF response 32 is a function of a variable x which represents the spatial coordinate along the direction of the array of the piezo-electric elements 5-1 (i=1, . . . , 7).

When this TOF response 32 is Fourier-transformed with respect to the variable x, a spatial spectrum $P(f_x)$ is obtained.

The x-directional component of the spatial frequency f of the ultrasonic beam is $f_x$. Since the TOF response 32 of the static target 30 is constant with respect to the variable x, the spectrum is such that $P(f_x)$ is distributed around $f_x=0$.

FIG. 2 (b) shows a TOF response for a moving target 33 approaching an ultrasonic transducer 4. In the signal transmission and reception sequence, the distance between the moving target 33 and the ultrasonic transducer array 4 including the piezo-electric elements 5-1 (i=1, . . . , 7) becomes shorter while the piezo-electric elements 5-1 to 5-7 are sequentially selected for receiving the ultrasonic wave reflected from the moving target 33. Thus, compared with the received signals from the static target 30 shown in FIG. 2 (a), the received signals from the moving target 33 are shifted a little along the time axis. When these signals are read out at the same positions as those of the TOF locus used for the static target 30, a TOF response 34 varying at a frequency proportional to the velocity of the moving target 33 is obtained.

The Fourier transformation of this TOF response 34 results in a spectrum having its peak at a positive frequency corresponding to the Doppler frequency.

Figure 2B:
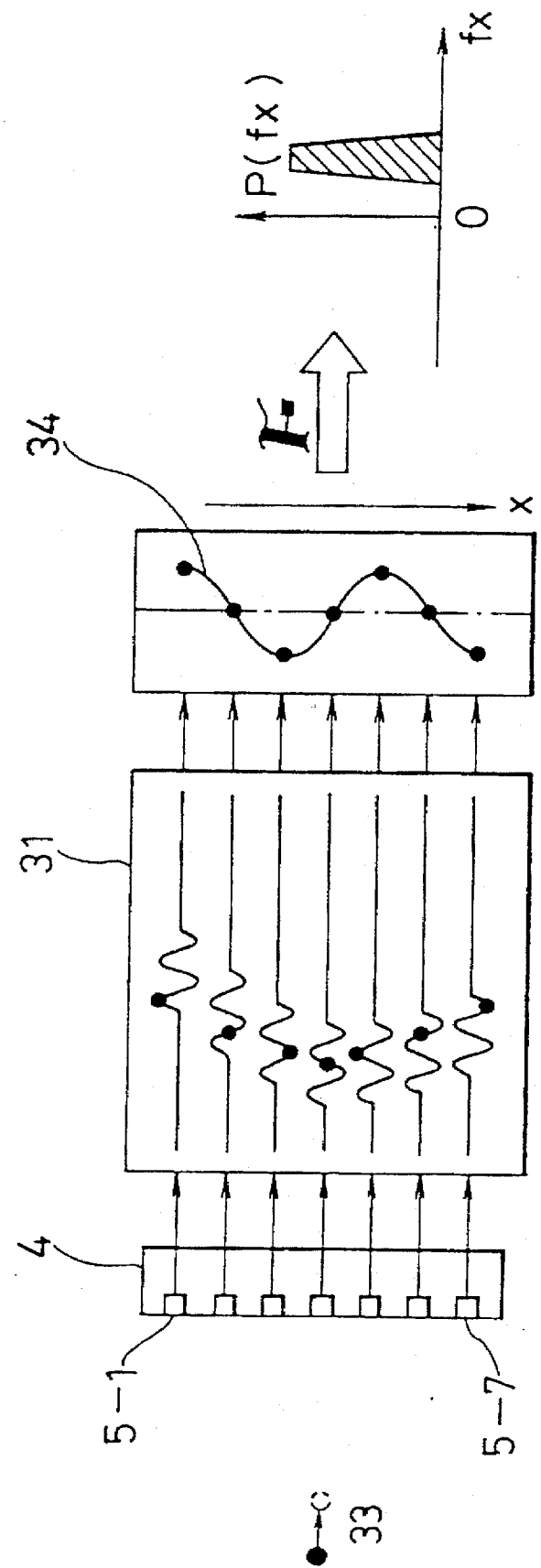

In FIGS. 2(a) and 2(b), the positions of the peak of the spectrum are different. Moreover, the frequency corresponding to the peak of the spectrum is in proportion with the velocity of the moving target 33. Thus, the velocity of the target can be measured by the spectrum analysis of the TOF response.

In the above description, for the purpose of simplicity, the received signals to be stored in the Doppler waveform storage means 31 have been treated as if they were real-valued functions. Actually, however, the received signals are processed as complex-valued functions by using quadrature demodulation or the like. At this time, the TOF response is also a complex-valued function so that the moving direction of the target can be known by determining whether the peak frequency of the spectrum is positive or negative.

Specifically, the positive peak frequency corresponds to the case in which the target is approaching the transducer array 4, and the negative peak frequency corresponds to the case in which the target is going away from the transducer array. When the velocity of the moving target is obtained from the spectrum, the following problem arises: an ac component appears in the spectrum of the TOF response not only when the target moves, but also when the target is still and offset from the principal axis of the TOF locus.

This phenomenon is due to the fact that the frequency components of the spectrum of the TOF response correspond to the beams emitted in the respective directions in the directional response pattern of the transducer array 4. That is, the component of $f_x=0$ corresponds to a plane wave traveling in a direction parallel with the central axis of the transducer array 4, and the high frequency component corresponds to a plane wave traveling in a direction at an angle $\theta=\sin^{-1}(f_x/f)$ to the central axis.

As the Fourier transformation is discretely implemented, the spatial frequency $f_x$ becomes discrete so that the traveling direction of the plane wave also becomes discrete. In the following description, a set of such plane waves is called a multi-directional beam.

Referring to FIGS. 3 (a), 3 (b) and 4, a principle to solve the above problem will now be described.

Figure 3A:
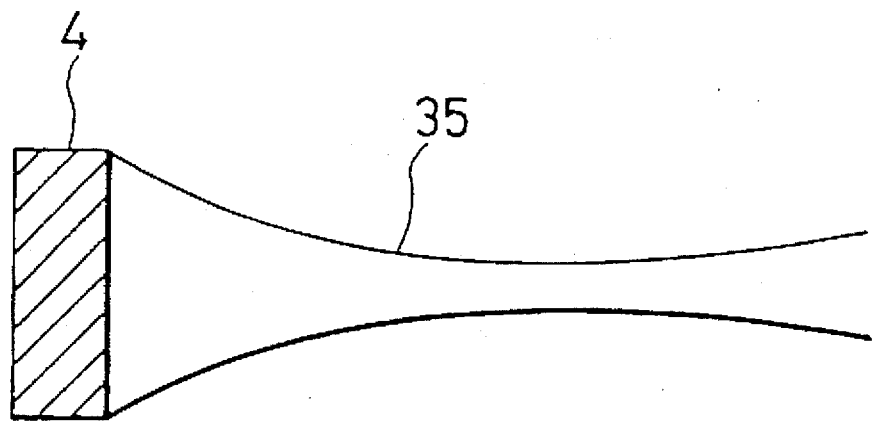
FIGS. 3(a) and 3(b) illustrate profiles of a transmitted ultrasonic beam and received ultrasonic beams, respectively, in accordance with the present invention.
Figure 3B:
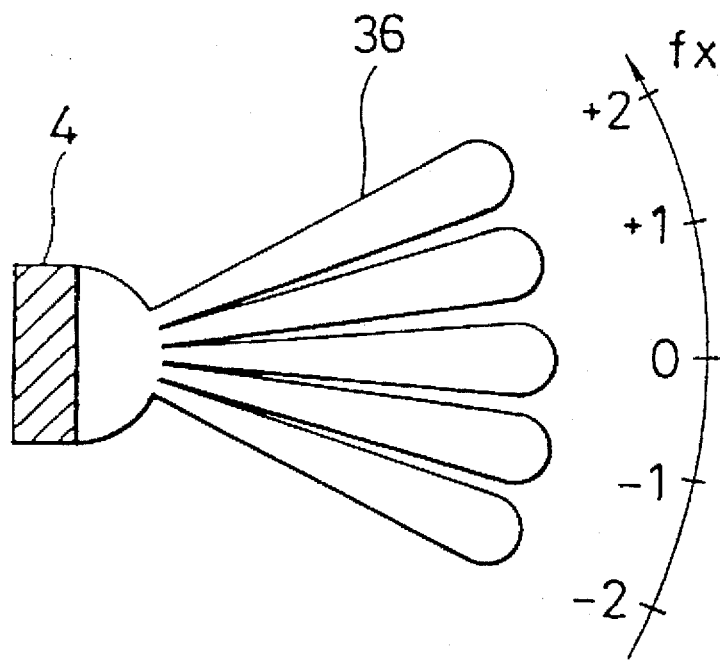

FIG. 3(a) shows an electronically converged beam 35 emitted by driving the piezo-electric elements with predetermined delays as explained in the above description of the conventional art. FIG. 3(b) shows that a received multi-directional beam 36 equivalently obtained by the Fourier transformation of the TOF response travels in different directions in accordance with the spatial frequency $f_x$.

Such a method of making the multi-directional beam by using the Fourier transformation to obtain the spatial frequency distribution from the received signals of a plurality of piezo-electric elements is applied to an underwater sonar, as described in the paragraph "Cross Sectional Imaging" by M. Okushima et al. (eds.), Marine Acoustics—Fundamentals and Applications, The Marine Acoustic Society of Japan, pp. 171–173, (1984).

In order to prevent the spatial frequency distribution after the Fourier transformation from being influenced by the ultrasonic pulse wave reflected from the static target, it is sufficient to ensure that the transducer array 4 receives only the ultrasonic pulse wave perpendicularly incident on the transducer array 4. For this purpose, the reflection from the target dislocated from the central axis of the transducer array 4 is forbidden. That is, as shown in FIG. 3(a), an electronically converged beam 35 is generated in the vertical direction by driving the piezo-electric elements with predetermined time delays at the time of beam transmission. When the electronically converged beam is emitted, the ultrasonic pulse wave reflected from the target dislocated from the axis does not return. Therefore, the above described principle of the velocity measurement of the moving target can be directly applied.

However, even if the ultrasonic beam for transmission is perpendicularly generated, a weak ultrasonic beam is emitted off the axis because of the existence of side lobes.

A basic signal for detecting the Doppler information is the signal reflected from the target in the blood flow. Compared with the intensity of a signal reflected from tissues, the intensity of the basic signal is about −40 dB. Therefore, the Doppler information is veiled if the signal reflected from the tissues is not completely eliminated.

In order to eliminate the signal reflected from the tissues, a transmission and reception sequence, and a signal processing method as shown in FIG. 4 are adopted. The transducer array 4 is driven with predetermined time delays to transmit the electronically converged beam 35, and the piezo-electric element 5-1 receives the beam in the range of a broad directional response pattern 37. This operation is repeated twice. By obtaining the difference between the intensities of two received signals obtained by the two emissions, the signal reflected from the tissues is eliminated so that the component of the signal from the moving target is detected as a deviation signal 38.

The reason why the signal reflected from the tissues can be eliminated is described below. By the subtraction, the intensity of the signal reflected from the still tissue becomes zero. However, the intensity of the signal reflected from the blood flow does not become zero since the phase of the signal is shifted in each sequence of beam transmission and reception. Thus, by obtaining the difference between the intensities of the two signals received at different time points, a kind of MTI filter is realized.

Figure 5:
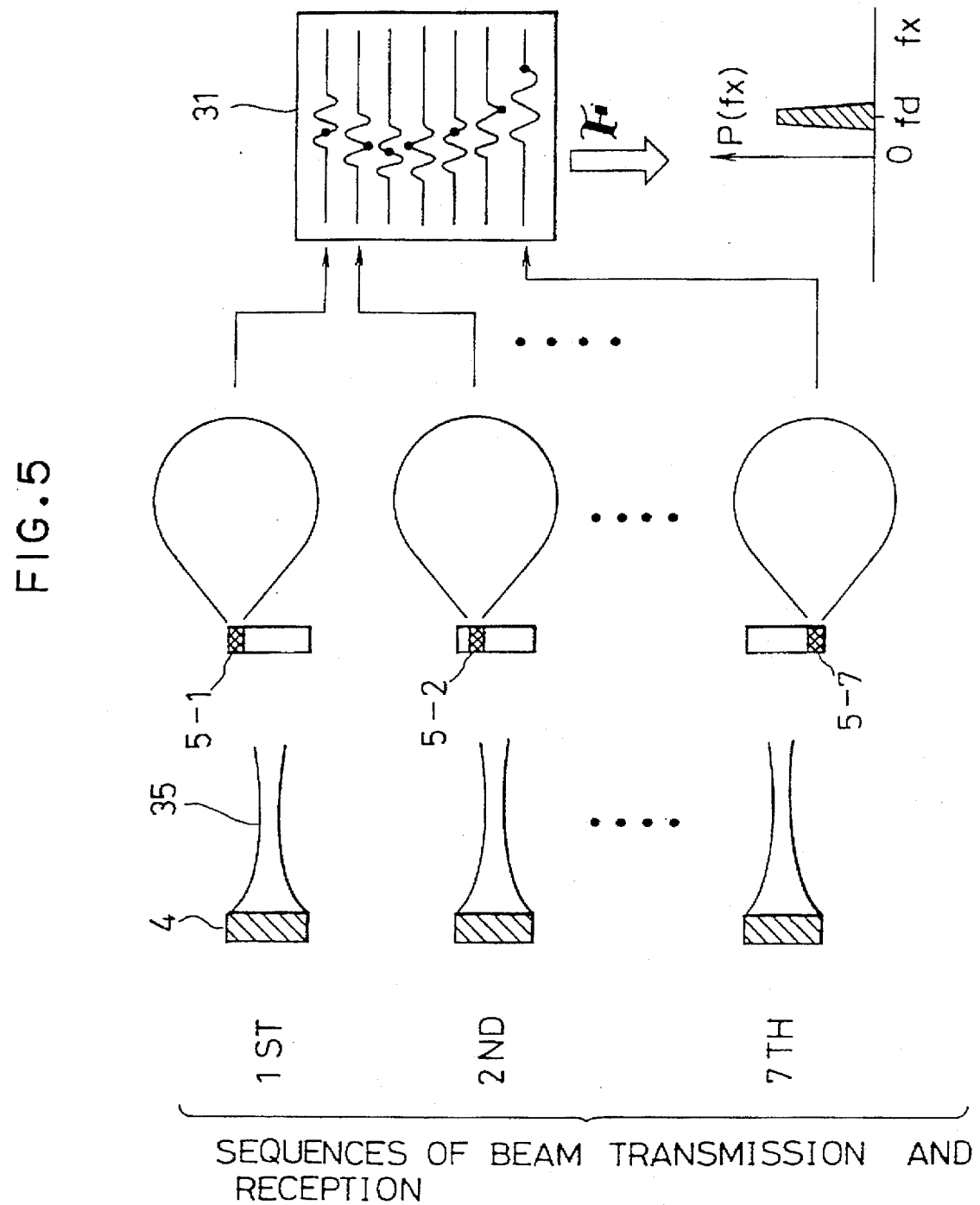
FIG. 5 schematically illustrates a principle of detecting a moving target in accordance with the present invention.

The principle of the present invention descried above is summarized in FIG. 5.

In sequence 1, the electronically converged beam 35 is transmitted twice from the plurality of piezo-electric elements 5-1 (i=1, ..., 7) included in the transducer array 4, and a subtraction is performed for the signals received by the same piezo-electric element 5-1. The result of the operation is stored in the Doppler waveform storage means 31. In sequence 2, the piezo-electric element 5-2 is selected for receiving the signal reflected from the target. Also in sequence 2, the piezo-electric elements for transmitting the beam and the process of transmission are the same as those of sequence 1. The subtraction for the signals received by the selected piezo-electric element 5-2 is performed, and its result is stored in the Doppler waveform memory 31. One of the piezo-electric elements 5-1 (i=1, ..., 7) is sequentially selected for receiving the signal from the target, and the above operations are repeated up to sequence 7.

When all signals received by the piezo-electric elements 5-1 (i=1, ..., 7) are stored in Doppler waveform memory 31, these signals are read out at the points indicated by black solid circles ●, and become a TOF response. The obtained TOF response is Fourier-transformed to obtain the spatial distribution $P(f_x)$.

The Fourier transformation of the TOF response means synthesizing the ultrasonic beam in the direction of the normal of the TOF locus when the Doppler frequency $f_d$ is detected. Although the directional response pattern of each of the piezo-electric elements 5-1 (i=1, ..., 7) is wide, the directional response pattern at the time of beam reception becomes narrow since an summing operation for each frequency component is performed by the Fourier transformation.

Further, since the TOF loci are independently set for the respective focal points near and remote from the transducer array 4, the Doppler information with fine spatial resolution can be detected irrespective of the detection distance.

2. Detailed Description of the Preferred Embodiment

Figure 6:
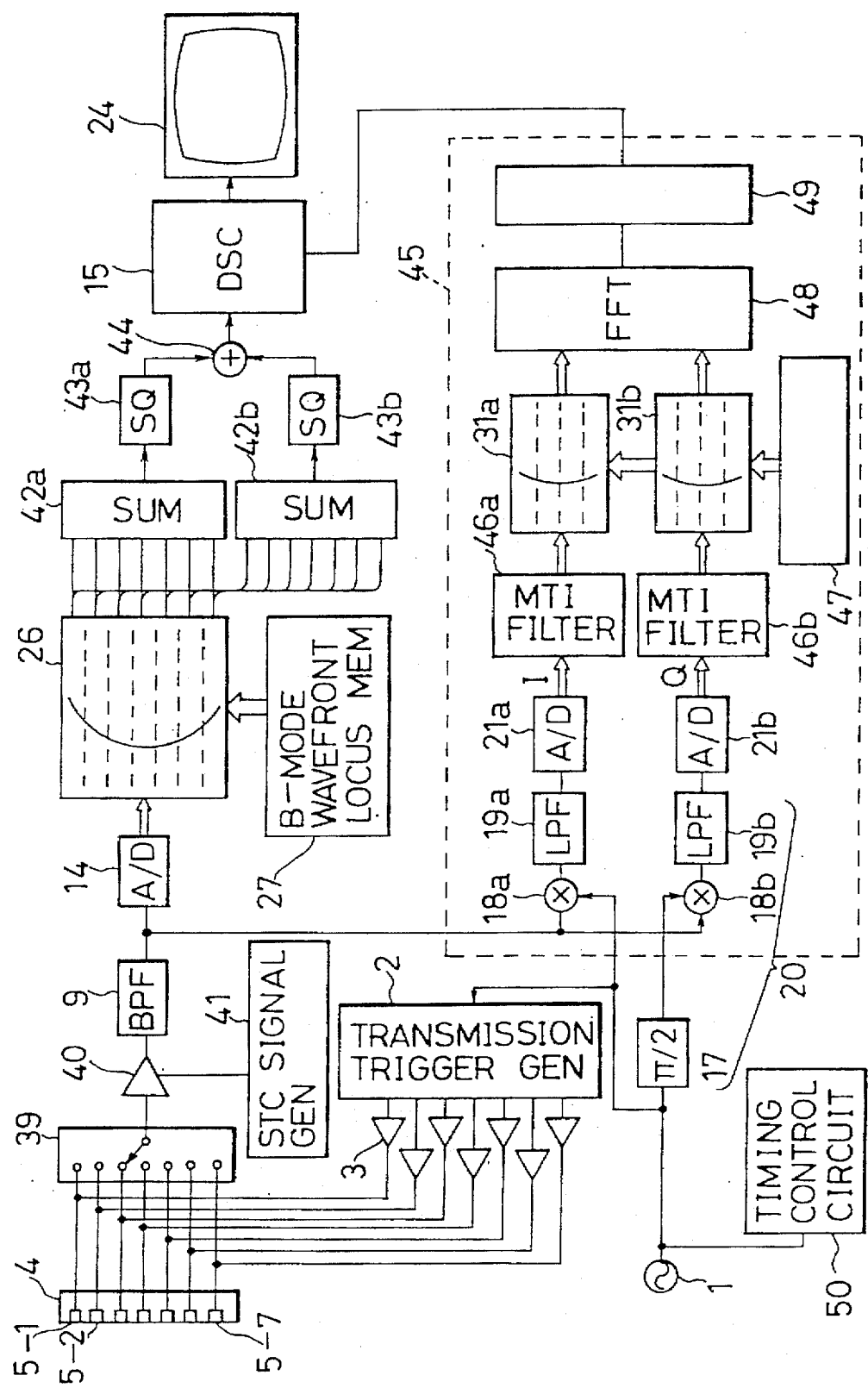
FIG. 6 is a block diagram of an ultrasonic diagnosing apparatus of the present invention.

Referring to FIG. 6, an embodiment of an ultrasonic diagnosing apparatus adopting the above-described principles of the present invention will be explained.

Figure 11:
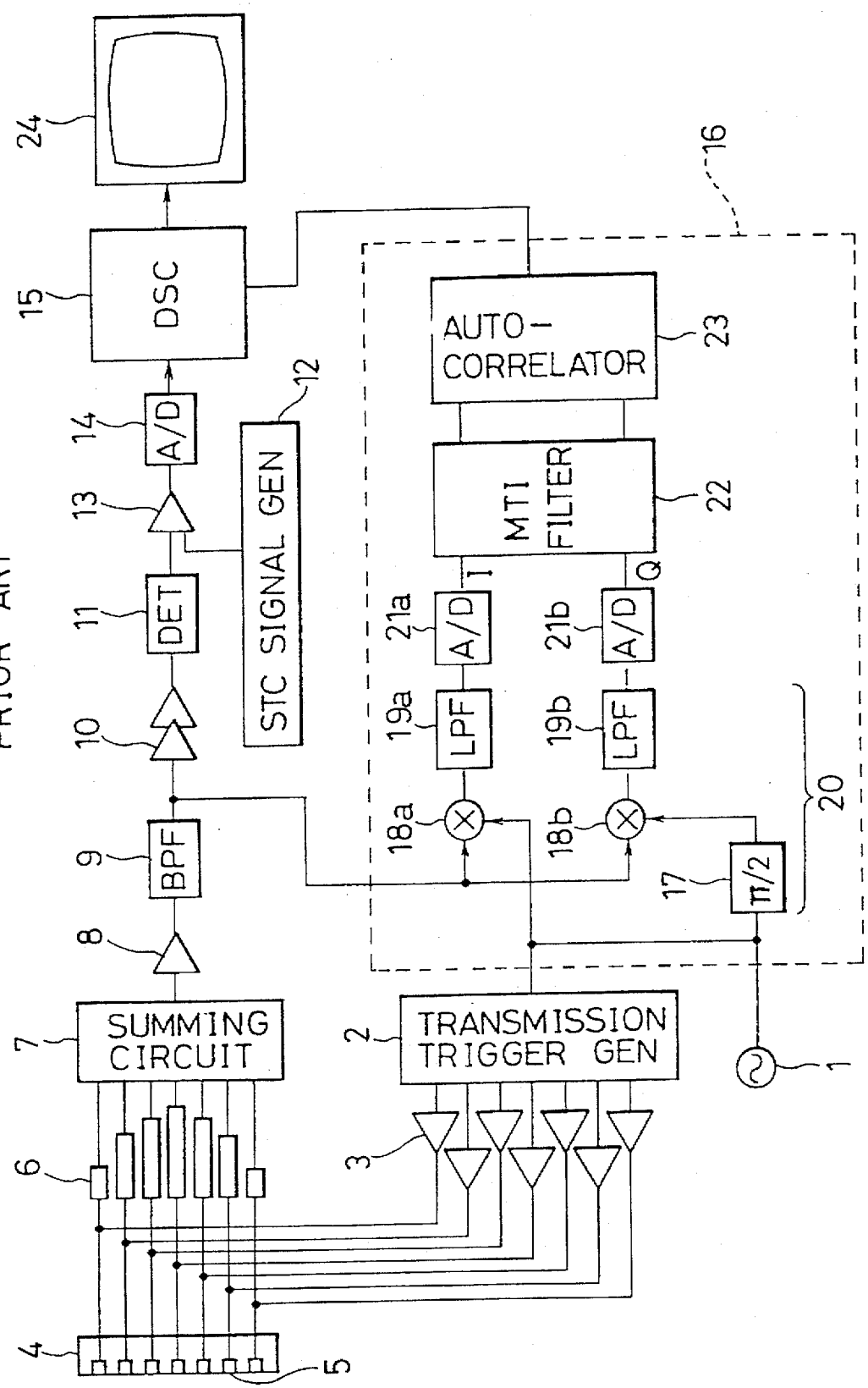
FIG. 11 illustrates a block diagram of a conventional ultrasonic diagnosing apparatus incorporating a blood flow imaging device using a color Doppler technique.

The same elements as those of the apparatus shown in FIG. 11 are given the same reference numerals, and their descriptions are omitted.

A multiplexer 39 is a switch to select one of piezo-electric elements 5-1 (i=1, ... 7) for receiving an ultrasonic wave. A received signal amplifier 40 is a linear amplifier to amplify the received signal of the selected piezo-electric element. The received signal amplifier 40 comprises a gain control amplifier, and changes its gain in accordance with an external control voltage. An STC signal generator 41 provides the received signal amplifier 40 with a gain control voltage for compensating the attenuation of the ultrasonic pulse wave traveling in the living body. The voltage generated by the STC signal generator 12 shown in FIG. 11 is linearly changed with respect to the depth. On the other hand, the voltage generated by the STC signal generator 41 is exponentially changed with respect to the depth. This is because the received signal to be sensitivity-time-controlled has not been logarithmically compressed, but only has been linearly amplified. As described above, the received signals corresponding to the respective piezo-electric elements 5-1 (i=1, ..., 7) are stored as time sequential data in B-scan mode waveform memory 26. A wavefront locus memory 27 is a look-up table storing a plurality of TOF loci corresponding to the whole space to be observed.

Summing circuits 42a and 42b sum the real components and imaginary components, respectively, of the received signals read out along the TOF locus. Squaring circuits 43a and 43b square the outputs from the summing circuits 42a and 42b, respectively. The adder 44 adds the squared amplitudes of the real and imaginary components of the received signal, and outputs the squared amplitude of the received signal.

A Doppler processing section 45 is provided for detecting the Doppler information by the Fourier transformation of the TOF response as described above. A quadrature demodulator 20 and A/D converters 21a and 21b are the same as those in FIG. 11.

MTI filters 46a and 46b perform subtracting operations for real components I and imaginary components Q, respectively, of the received signals outputted from the quadrature demodulator 20 corresponding to the two transmissions and receptions, and extract the signal component from the moving target. Doppler waveform memories 31a and 31b store the real and imaginary components of the moving target signal component, respectively, as time sequential data.

Similar to the wavefront locus memory 27, a Doppler wavefront locus memory 47 is a look-up table for storing the TOF loci of the whole space for which the Doppler information should be detected.

A fast Fourier transforming circuit 48 Fourier transforms with respect to the variable x the TOF response read out from the Doppler waveform memories 31a and 31b along the TOF locus.

A velocity deriving circuit 49 is a circuit to calculate the velocity of the blood flow from the peak frequency of the spatial frequency distribution.

A timing control circuit 50 generates a master clock with its phase determined by the reference signal generated from a signal generator 1, and outputs to respective electric circuits control signals (not shown) for controlling operations of the whole device in accordance with a master clock (not shown).

Thus, the block diagram for signal processing shown in FIG. 6 is divided into a circuit section for obtaining a B-scan mode image (hereinafter called "ultrasonic tomogram obtaining section") and the Doppler processing section 45.

Their operations are as follows:

The sequences of the ultrasonic tomogram obtaining section and the Doppler processing section 45 are alternatively performed.

First, in the ultrasonic tomogram obtaining sequence, the multiplexer 39 is changed over under the control of the timing control circuit 50, and an ultrasonic pulse wave is transmitted in a wide range from a selected piezo-element 5-1 by a transmission trigger generating circuit 2 and a transmission signal amplifier 3. An ultrasonic wave reflected from a target is received by the selected piezo-electric element 5-1, and amplified with a predetermined gain by the received signal amplifier 40. At this time, the gain is controlled by the STC signal generator 41 so that the attenuation of the ultrasonic wave in a living body is compensated.

After any unnecessary noise is removed from the received signal by band-pass filter 9, the signal is converted to a digital signal by an A/D converter 14, which is stored into the B-scan mode waveform memory 26.

Next, an adjacent piezo-electric element 5-2 is selected by the multiplexer 39. The same operations as those for the piezo-electric element 5-1 are performed for the piezo-electric element 5-2 to store the received signal in the B-scan mode waveform memory 26.

The same process is repeated for the remaining piezo-electric elements 5-3, ..., 5-7.

When the operations described above are completed, data corresponding to a focal point intended to be synthesized are read out from the B-scan mode waveform memory 26 on the bases of the addresses generated from the wavefront locus memory 27, and summed by the circuits 42a and 42b. The reason why the two summing circuits are used is that the real and imaginary components are separately summed.

In this embodiment of the present invention, the real and imaginary components are separated by a quadrature sampling technique applied when the digital signal is read out from the memory, instead of a conventional quadrature demodulating technique for the analog received signal. In the quadrature sampling technique, two kinds of TOF loci for the real component and the imaginary component are generated from the B-scan mode wavefront locus memory 27. These two kinds of loci are set to read out the received signals at the positions corresponding to the time shift equivalent to a phase shift of π/2 at the center frequency of the received signals. The details are described in Jeffrey E. Powers et al., "Ultrasound Phased Array Delay Lines Based on Quadrature Sampling Techniques", IEEE Trans. Sorties and Utrason., SU-27, 6, pp. 287–294, 1980.

The real and imaginary components are converted to the power at the focal point by the squaring circuits 43a and 43b and the adder 44, and transmitted to a digital scan converter 15.

Figure 7:
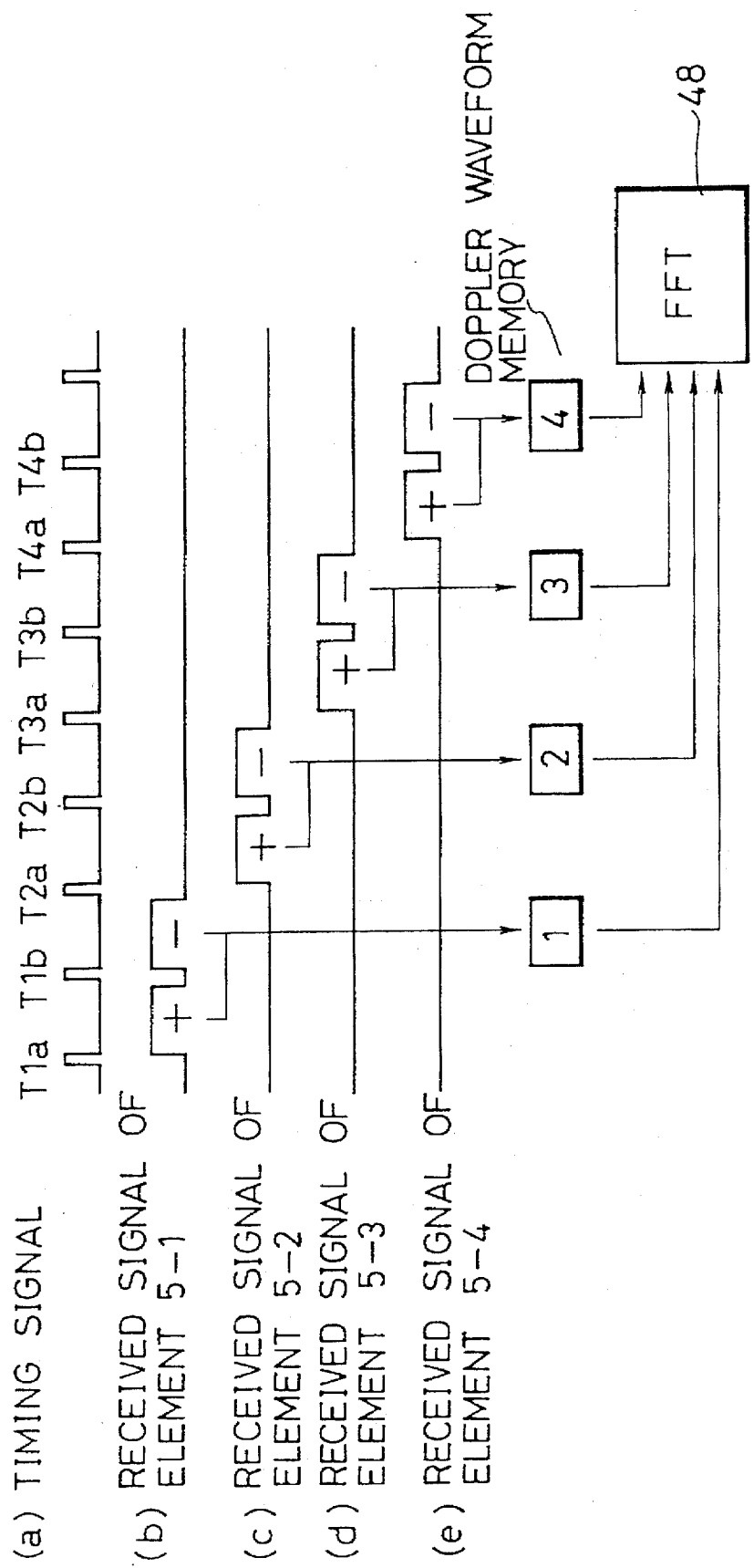
FIG. 7 is a timing chart showing signal transmission and reception according to the present invention.

Next, referring to FIG. 7, the Doppler process sequence will now be described.

The transmission trigger generating circuit 2 generates timing signals T1a, T1b, T2a, T2b, ..., which are synchronized with the reference signal generated by the signal generator 1. The transmission trigger generating circuit 2 also transmits to the transmission amplifier 3 in synchronism with this timing signal a group of pulse signals with predetermined time delays to focus at a predetermined point. The transmission amplifier 3 amplifies the group of pulse signals to form a group of driving pulse signals having large amplitudes and to drive the plurality of piezo-electric elements 5-1 (i7).

The wave reflected from the living body is received by the piezo-electric element 5-1 selected by the multiplexer 39 and converted to an electric signal. The signal is amplified by the received signal amplifier 40 and filtered by the band-pass filter 9. The real component I and the imaginary component Q are separated by the quadrature demodulator 20 and digitized by the A/D converters 21a and 21b.

Further, the signal component from the tissue is removed from the received signal by the MTI filters 46a and 46b to obtain only the signal component from the moving target which is stored in the Doppler waveform memories 31a and 31b. At this time, the piezo-electric element 5-1 receives the beam twice, which corresponds to the two transmission operations of the electronically converged beam at transmission timing T1a and T1b. The received signal portions at respective timing are indicated in FIG. 7(b) and their difference is stored in the Doppler waveform memories 47a and 47b. By changing over the multiplexer 39, the same process is repeated until the signal received by the piezo-electric element 5-4 is stored (See FIG. 7, (c),(d) and (e)).

Then, the fast Fourier transforming circuit 48 transforms to the spatial spectrum the moving target signals received by the respective piezo-electric elements 5-1 and stored in the Doppler waveform memory 31. At this time, a series of data read out from the Doppler waveform memory 31 is sampled on the bases of the addresses generated by the Doppler wavefront locus memory 47, and it is a kind of spatial signal forming a focal point.

The peak frequency $f_{peak}$ is detected by the velocity deriving circuit 49 from the spatial frequency distribution of the TOF response obtained by the process described above. The velocity of the blood flow $v_d$ is calculated by the following equation:

$$V_d = (\lambda/2) f_{peak}$$

By the same process described above, the blood flow velocities for the whole area in which the Doppler information should be detected are obtained, and transmitted to the digital scan converter 15 as the Doppler information. The digital scan converter 15 displays the Doppler information on the color monitor 24 in red colors when the Doppler information is positive (that is, the peak frequency $f_{peak}$ is positive), and in blue colors when the Doppler information is negative (that is, the peak frequency $f_{peak}$ is negative) in such a manner that the Doppler information is superimposed on the ultrasonic tomogram obtained in the ultrasonic tomogram obtaining sequence.

Figure 8:
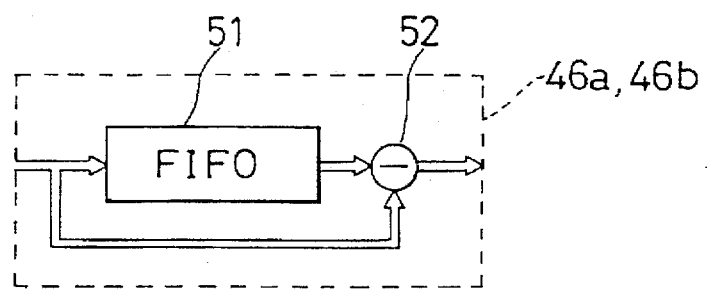
FIG. 8 is a block diagram of an MTI filter included in an ultrasonic diagnosing apparatus of the present invention.

The MTI filters 46a and 46b adopted in this embodiment will be described further in detail. In FIG. 8, an example of an MTI filter is shown.

A first-in first-out (FIFO) memory 51 is a temporary memory for storing the transmitted portion of the received signal. A subtracter 52 is provided for subtracting from the output of the FIFO memory 51 the received signal currently being inputted in the MTI filter.

The operation of the MTI filter is as follows:

In the two cycles of transmission and reception, the first received signal is inputted into the FIFO memory 51, and the second received signal is subtracted from the output of the FIFO memory by the subtracter 51. By the operation described above, the difference between the two received signals obtained by the same piezo-electric element in the two cycles of transmission and reception is calculated to eliminate the signal component reflected from the static tissue.

The operation of the MTI filter is considered in the frequency domain. When the transmission interval is T, the impulse response g(t) of the MTI filter is given by the following equation:

$$g(t) = \delta(t) - \delta(t-T)$$

Thus, the frequency response G(ω) of the MTI filter, which is the Fourier transformation of the impulse response, is given by the following equation:

$$G(\omega) = 1 - \exp(j\omega T)$$

Figure 9:
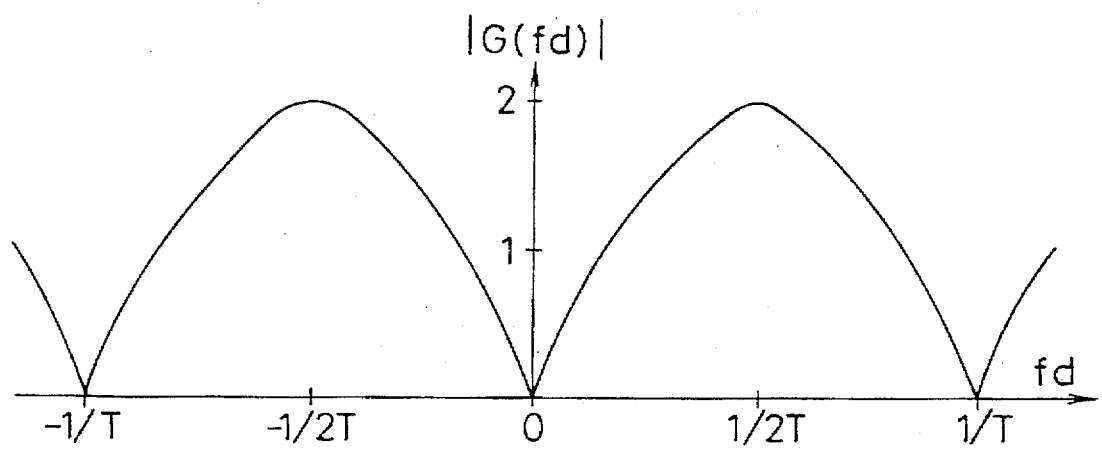
FIG. 9 illustrates a frequency response of the MTI filter shown in FIG. 8.

In FIG. 9, the absolute value of the frequency response G(ω) is shown. In FIG. 9, the horizontal axis represents the Doppler frequency $f_d = \omega/2\pi$. Thus, each of the MTI filters removes the input signal at a frequency of 1/T.

Next, the range of the blood flow which can be detected by the fast Fourier transforming circuit 48 and the velocity denying circuit 49 is considered. The TOF response as the data treated by the fast Fourier transforming circuit 48 is a set of data points sampled substantially at a period of 2T, the number of the data points being N corresponding to the number of the piezo-electric elements 5-1 for receiving the ultrasonic wave reflected from the target. By the sampling theorem, the maximum frequency $f_{max}$ which can be detected is 1/4T. Thus, line spectra are positioned at an interval of 1/2NT in this spectrum distribution. The interval between the line spectra equals the minimum frequency $f_{min}$ which can be detected.

Figure 10:
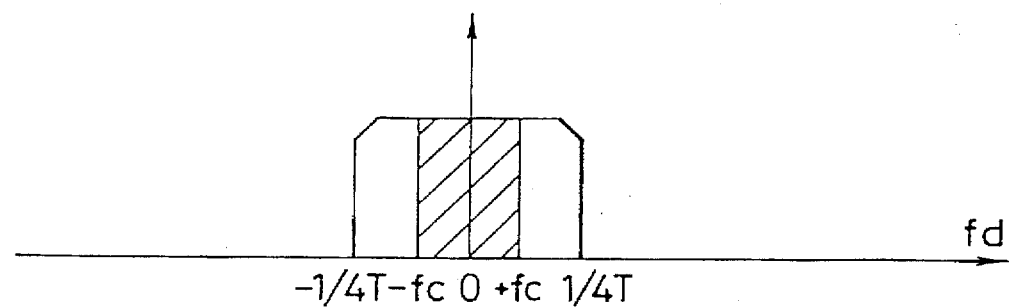
FIG. 10 illustrates a frequency response of a high-pass filter included in an ultrasonic diagnosing apparatus of the present invention.

In FIG. 10, a spectrum of a TOF response is shown.

The minimum velocity $v_{min}$ of the blood flow is estimated when T is 150 µs and N is 16. When the frequency of the used ultrasonic wave is 7.5 MHz and the velocity of the wave in the living body is 1500 m/s, the wavelength λ, of the ultrasonic wave traveling in the living body is 0.2 mm. At this time, the minimum velocity $v_{min}$ is obtained by the following equation:

$$v_{min} = (\lambda/2) f_{min} = 0.021 \ m/s$$

On the other hand, the maximum velocity $v_{max}$ of the blood flow which can be detected is obtained by the following equation:

$$v_{max} (\lambda/2) f_{max} = (\lambda/2) 8 f_{min} = 0.168 \ m/s$$

The velocity of the blood flow is obtained within the above range. In this case, for the purpose of simplicity, the velocity $v_d$ of the blood flow is obtained from the peak frequency $f_{peak}$ of the spectrum. However, in a real situation, the TOF response may not be symmetrical, or the peak of the frequency may not be clear. Consequently, it may be more effective to calculate the velocity $v_d$ of the blood flow by utilizing the frequency in which the spread of the spectrum is also considered, such as the center frequency $f_{center}$, representing the center of gravity of the spectrum. There is a difference of 40 dB between the intensities of the clutter signal component and the blood flow reflection signal component. Moreover, the clutter component has a small amount of a low frequency ac component. Thus, the simple MTI filters 46a and 46b cannot completely remove the clutter component. Therefore, it is better to remove the low frequency component from the spectrum of the TOF response.

In FIG. 10, the hatched area is the portion of the spectrum affected by the clutter component. Only by removing the data between the positive and negative $f_c$s is the ideal highpass filter realized so that the Doppler information is not affected at all by the clutter component. That is, the fast Fourier transforming circuit 48 has the function of filtering in addition to the function of detecting the Doppler frequency.

The Doppler image may be displayed in the following way.

Irrespective of the frequency, the sum of the respective components of the spectrum of the TOF response are summed to be the power of the Doppler component. Then, irrespective of the direction of the blood flow, the Doppler information is converted to the intensity in the red colors in proportion with the power, and displayed. In this display method, all power of the blood reflection signal component is displayed so that the detectability of the blood flow is increased.

In this embodiment, based on the quadrature demodulating technique, the Doppler processing section 45 detects the complex amplitude of the received signal by means of the quadrature demodulator 20. However, the complex amplitude of the received signal may be detected based on the quadrature sampling technique adopted in the ultrasonic tomogram obtaining section.

What is claimed is:

1. An ultrasonic diagnosing apparatus comprising:
   an ultrasonic transducer having a plurality of piezo-electric elements arranged in an array;
   a transmitting means for forming at least one electronically converged ultrasonic beam by driving a transmitting aperture, wherein said transmitting aperture consists of at least two of said piezo-electric elements driven in accordance with predetermined delays;
   a waveform storing means for storing a plurality of waveforms, each of said plurality of waveforms corresponding to a reflected signal received by a corresponding one of said plurality of piezo-electric elements;
   a wavefront locus storing means for storing a plurality of wavefront locus data corresponding to a plurality of focal points in an object under inspection, wherein said wavefront locus data comprises a data set of delay time that said piezo-electric elements form a wavefront focusing upon one of said focal points, and for outputting said wavefront locus data to said waveform storing means as read-out addresses such that said waveform storing means outputs a spatial distribution of said reflected signals along the direction of said wavefront;
   a data conversion means for converting said spatial distribution of said reflected signals from a spatial domain into a spatial frequency domain along said wavefront locus;
   a velocity deriving means for deriving a velocity of a moving target in said object under inspection from the resulting spatial frequency distribution out of said data conversion means;
   a filtering means for extracting signal components reflected from the moving target in said object under inspection by removing signal components reflected from a static target, the output of the filtering means being supplied to said waveform storing means; and
   a transmission triggering means for outputting a plurality of trigger pulses to said transmitting means, said transmitting aperture being driven twice for every receiving operation of the respective piezo-electric elements, wherein said filtering means includes a deviation calculating means for calculating a deviation signal between two reflected signals acquired in response to two driving operations of said transmitting aperture.

2. The apparatus according to claim 1, further comprising a quadrature demodulating circuit for demodulating said reflected signals received by the respective piezo-electric elements to acquire complex amplitudes of said reflected signals, wherein said waveform storing means includes a real waveform memory for storing real components of said complex amplitudes and an imaginary waveform memory for storing imaginary components of said complex amplitudes.

3. The apparatus according to claim 1, wherein said wavefront locus storing means stores respective pairs of said wavefront locus data corresponding to said focal points, each of said pairs consisting of two wavefront locus data having a time shift equivalent to a phase shift of λ/2 radians at a center frequency of said at least one electronically converged ultrasonic beam, and outputs said pairs of said wavefront locus data to said waveform storing means as read-out addresses such that said waveform storing means outputs complex amplitudes of said spatial distributions of said reflected signals along the directions of said wavefront locus data based on a quadrature sampling method.

4. The apparatus according to claim 1, further comprising a selecting means for consecutively selecting said piezo-electric elements as a receiving transducer, in synchronism with the driving operation of said aperture.

5. The apparatus according to claim 1, wherein said data conversion means includes a fast Fourier transforming means for performing a fast Fourier transform on said spatial distribution of said reflected signals from the spatial domain into said spatial frequency domain along the direction of said wavefront locus.

6. The apparatus according to claim 1, further comprising a high pass filtering means for reducing frequency components originating from a static target in said object under inspection by removing low frequency components of said spatial frequency distribution delivered by said data conversion means.

7. The apparatus according to claim 1, wherein said velocity deriving means includes a peak frequency detecting means for detecting a peak frequency in said spatial frequency distribution delivered by said data conversion means, and a calculating means for calculating said velocity of said moving target from said peak frequency detected by said peak frequency detecting means.

8. The apparatus according to claim 1, further comprising a color Doppler image generating means for generating color signals comprising a color Doppler image by varying at least one of (a) a plurality of chromatic components and (b) a plurality of intensity components of said color signals in accordance with said velocity derived by said velocity deriving means.

9. The apparatus according to claim 8, further comprising an ultrasonic tomogram generating means for generating a B-scan mode image of said object under inspection from said reflected signals received by said piezo-electric elements, and a superimposing means for superimposing said color Doppler image on said B-scan mode image.

10. The apparatus according to claim 9, further comprising a timing control means for generating control signals to alternatively execute a sequence to acquire said reflected signals for generating said color Doppler image and a sequence to acquire said reflected signals for generating said B-scan mode image.

11. The apparatus according to claim 1, further comprising a power calculating means for calculating a total sum of ac components in said spatial frequency distribution, and a power Doppler image generating means for generating color signals dependent on said total sum of ac components so as to generate a power Doppler image comprising an intensity distribution of reflected signals from said moving target in said object under inspection, said power calculating means and said power Doppler image generating means excluding the information concerning the direction of said velocity derived by said velocity deriving means.

12. The apparatus according to claim 11, further comprising an ultrasonic tomogram generating means for generating a B-scan mode image of said object under inspection from said reflected signals received by said piezo-electric elements, and a superimposing means for superimposing said power Doppler image on said B-scan mode image.

13. The apparatus according to claim 12, further comprising a timing control means for generating control signals to alternatively execute a sequence to acquire said reflected signals for generating said power Doppler image and a sequence to acquire said reflected signals for generating said B-scan mode image.

14. The apparatus according to claim 1, further comprising an ultrasonic tomogram generating means for generating a B-scan mode image of said object under inspection from said reflected signals received by said piezo-electric elements.

* * * * *

UNITED STATES PATENT AND TRADEMARK OFFICE
CERTIFICATE OF CORRECTION

PATENT NO. : 5,706,818
DATED : January 13, 1998
INVENTOR(S) : Masahiko GONDO

Page 1 of 2

It is certified that error appears in the above-indentified patent and that said Letters Patent is hereby corrected as shown below:

Column 2, line 2, change "with" to --to--.

Column 3, line 23, change "is" to --are--.

Column 6, line 26, after "point" insert a comma.

Column 10, line 10, change "descried" to --described--.

Column 10, line 38, change "an" to --a--.

Column 11, line 34, change "Fourier transforms" to --Fourier-transforms--.

Column 12, line 32, change "Sorties" to --Sonics--.

Column 13, line 16, change "$V_d$is" to --$V_d$ is--.

Column 14, line 1, change "denying" to --deriving--.

Column 14, line 27, change "Vmax($-1/2$)..." to --Vmax=($f/2$)...--.

UNITED STATES PATENT AND TRADEMARK OFFICE
CERTIFICATE OF CORRECTION

PATENT NO. : 5,706,818
DATED : January 13, 1998
INVENTOR(S) : Masahiko GONDO

It is certified that error appears in the above-indentified patent and that said Letters Patent is hereby corrected as shown below:

Column 15, line 60, change "$\lambda/2$" to --$\pi/2$--.

Signed and Sealed this

Sixth Day of June, 2000

Attest:

Q. TODD DICKINSON

*Attesting Officer*  *Director of Patents and Trademarks*